(12) United States Patent
Haerihosseini

(10) Patent No.: US 10,475,245 B2
(45) Date of Patent: Nov. 12, 2019

(54) PROVIDING FOLDING PATTERNS FOR CREATING AUGMENTED REALITY TARGET OBJECTS

(71) Applicant: L'Oreal, Paris (FR)

(72) Inventor: Seyed Morteza Haerihosseini, Rahway, NJ (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 15/906,816

(22) Filed: Feb. 27, 2018

(65) Prior Publication Data

US 2019/0266799 A1    Aug. 29, 2019

(51) Int. Cl.
| | |
|---|---|
| G06T 19/00 | (2011.01) |
| G06T 7/70 | (2017.01) |
| H04L 29/06 | (2006.01) |
| H04N 1/00 | (2006.01) |
| H04N 1/32 | (2006.01) |
| B31D 5/00 | (2017.01) |
| G06K 19/06 | (2006.01) |
| G06K 7/14 | (2006.01) |
| B31B 50/25 | (2017.01) |
| B31B 50/88 | (2017.01) |

(52) U.S. Cl.
CPC ............ *G06T 19/006* (2013.01); *B31B 50/25* (2017.08); *B31B 50/88* (2017.08); *B31D 5/0086* (2013.01); *G06K 7/1447* (2013.01); *G06K 19/06009* (2013.01); *G06T 7/70* (2017.01); *H04L 67/38* (2013.01); *H04N 1/00639* (2013.01); *H04N 1/00663* (2013.01); *H04N 1/32203* (2013.01)

(58) Field of Classification Search
None
See application file for complete search history.

(56) References Cited

U.S. PATENT DOCUMENTS

| | | | |
|---|---|---|---|
| 2011/0063726 A1* | 3/2011 | Ramstad | G02B 27/2207 359/464 |
| 2016/0217590 A1* | 7/2016 | Mullins | G06T 7/40 |
| 2018/0240065 A1* | 8/2018 | Hilsley | G06K 19/06037 |

OTHER PUBLICATIONS

App Jar LLC, "AR Kitten for Merge Cube APK", retrieved from https://apkpure.co/ar-kitten-for-merge-cube/, published on Aug. 15, 2017, retrieved on Mar. 29, 2019.*
Anonymous, "Papercraft & Origami", retrieved from https://archived.moe/po/thread/559360, posted before Feb. 22, 2018, retrieved on Mar. 27, 2019.*
Author unknown, "Merge Cube Review", retrieved from https://arcritic.com/1415/merge-cube-review/, posted on Jan. 9, 2018, retrieved on Mar. 27, 2019.*

(Continued)

*Primary Examiner* — Zhengxi Liu
(74) *Attorney, Agent, or Firm* — Christensen O'Connor Johnson Kindness PLLC

(57) ABSTRACT

In some embodiments, folding patterns are provided that can be folded to create three-dimensional target objects for use in augmented reality environments. In some embodiments, the folding patterns may include joining means to secure the folded shape and thereby enhance usability and durability. In some embodiments, the folding patterns may also include patterns that can be used to identify a particular virtual object to be rendered in association with the three-dimensional target object.

8 Claims, 8 Drawing Sheets

(56) References Cited

OTHER PUBLICATIONS

Teich, "Merged VR: Augmented Reality Cubed", retrieved from https://www.technewsworld.com/story/84744.html, published on Aug. 18, 2017, retrieved on 3/328/2019.*

Takahashi, D., "Merge Cube Augmented Reality Toy Debuts at Walmart," VentureBeat, Aug. 1, 2017, <https://venturebeat.com/2017/08/01/merge-cube-augmented-reality-toy-debuts-at-walmart/> [retrieved Sep. 27, 2018], 4 pages.

* cited by examiner

PROVIDING FOLDING PATTERNS FOR CREATING AUGMENTED REALITY TARGET OBJECTS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a flat paper product configured to be folded into a three-dimensional target shape for use with an augmented reality system is provided. The flat paper product comprises a pattern indicating folds to be applied to the flat paper product to form the flat paper product into the three-dimensional target shape, one or more creases or scores that coincide with the pattern, and means for attaching a first portion of the pattern to a second portion of the pattern to secure the three-dimensional target shape.

In some embodiments, an augmented reality system is provided. The system comprises a server computing device and an augmented reality device. The server computing device comprises a product data store. The augmented reality device comprises a camera and a display device. The augmented reality device is configured to capture an image of a three-dimensional target shape using the camera; transmit a query to the server computing device for information defining a virtual object associated with the three-dimensional target shape; and cause the virtual object to be presented by the display device.

In some embodiments, a method of manufacturing a three-dimensional target shape for use with an augmented reality system is provided. A pattern is printed on a flat paper product, wherein the pattern indicates folds to be applied to the flat paper product to form the flat paper product into the three-dimensional target shape. The flat paper product is creased or scored in at least one location that coincides with the pattern. Means for attaching a first portion of the pattern to a second portion of the pattern are applied to the flat paper product.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The advent of the wide availability of devices such as smartphones has greatly increased the ways in which information can be disseminated to the public. One example of a presentation of information that is possible with a smartphone (or similar device) is an augmented reality presentation. In an augmented reality presentation, the smartphone presents video as captured by its camera, along with one or more computer-generated "virtual objects" that appear to be in the scene captured by the camera.

Some augmented reality presentations have virtual objects that merely float in the scene. These presentations can be greatly improved by using an anchor, or a real-world object to which the virtual object is attached within the augmented reality view. Previously two-dimensional QR codes have been used as anchors. However, the two-dimensional nature of QR codes makes them difficult to interact with, and also makes them unsuitable for mimicking an actual virtual object. Further, existing three-dimensional anchors are not easily distributable or customizable. What is desired are techniques for creating three-dimensional target objects that are easily distributable, customizable, and capable of reliable construction by end users.

To address these problems and to also provide additional functionality, embodiments of the present disclosure provide folding patterns that can be folded to create three-dimensional target objects for use in augmented reality environments. In some embodiments, the folding patterns may include joining means to secure the folded shape and thereby enhance usability and durability. In some embodiments, the folding patterns may also include patterns that can be used to identify a particular virtual object to be rendered in association with the three-dimensional target object.

Figure 1:
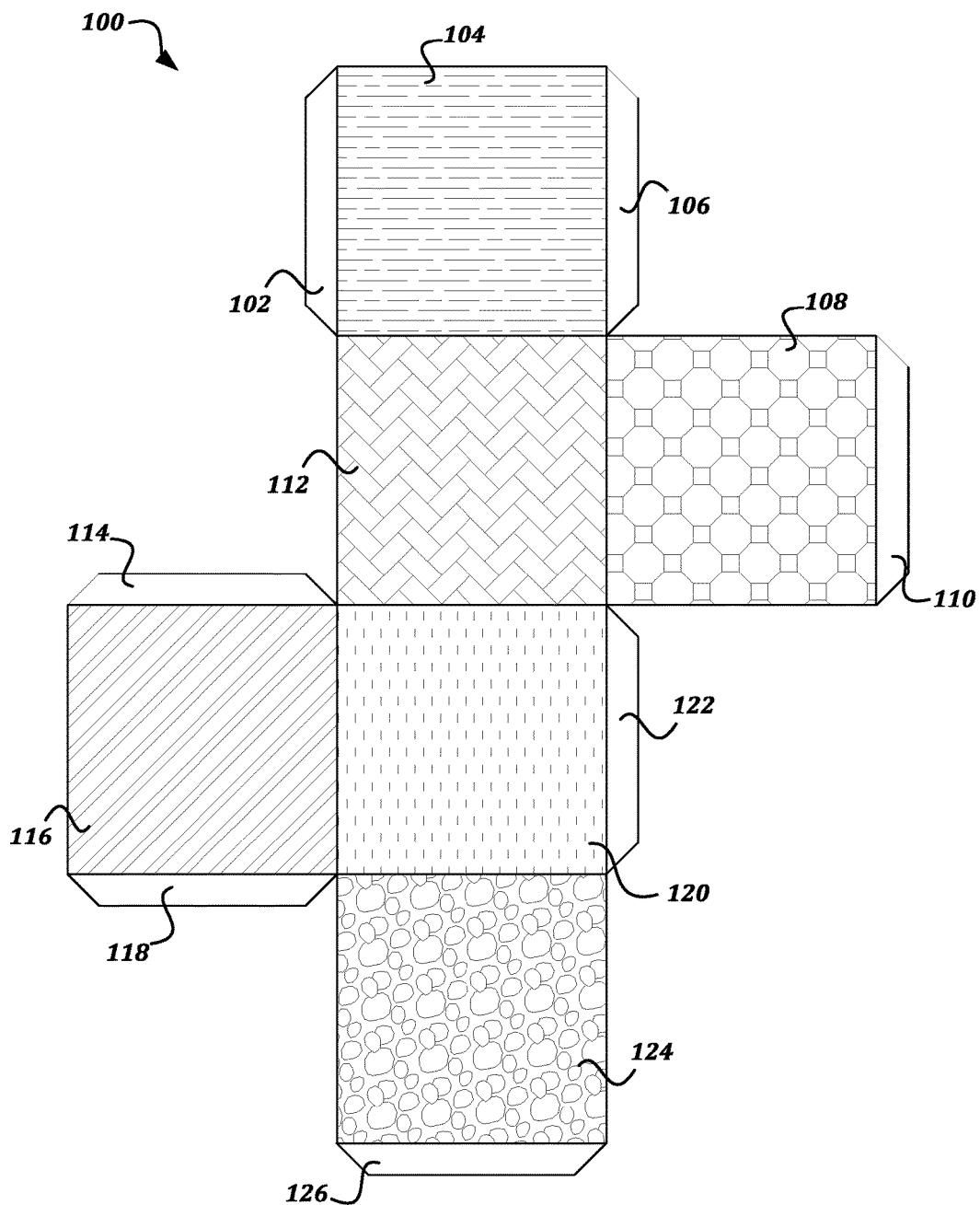
FIG. 1 is a detailed illustration of an example embodiment of a three-dimensional folding pattern according to various aspects of the present disclosure.

FIG. 1 is a detailed illustration of an example embodiment of a three-dimensional folding pattern according to various aspects of the present disclosure. The illustrated three-dimensional folding pattern 100 is suitable for being folded into a cube. As such, the three-dimensional folding pattern 100 includes six faces 104, 112, 108, 116, 120, and 124. Each of the faces 104, 112, 108, 116, 120, and 124 includes a distinct pattern. Once the three-dimensional folding pattern 100 is folded to create a three-dimensional target object, the distinct patterns enable an augmented reality device 702 to determine an orientation of the three-dimensional target object, as discussed further below. The three-dimensional folding pattern 100 also includes a plurality of tabs 102, 106, 110, 114, 118, 122, and 126. In some embodiments, the plurality of tabs may include joining means, such as adhesives, magnets, or other means as discussed below. The joining means allow the three-dimensional folding pattern 100 to be secured in its folded state. In some embodiments, the three dimensional folding pattern 100 may be constructed from card stock or other heavy weight paper, and the lines separating the faces 104, 112, 108, 116, 120, and 124 from each other and from the tabs 102, 106, 110, 114,

118, 122, and 126 that indicate where folds should occur may be scored or creased in order to assist the user in forming the three-dimensional target object.

Figure 2:
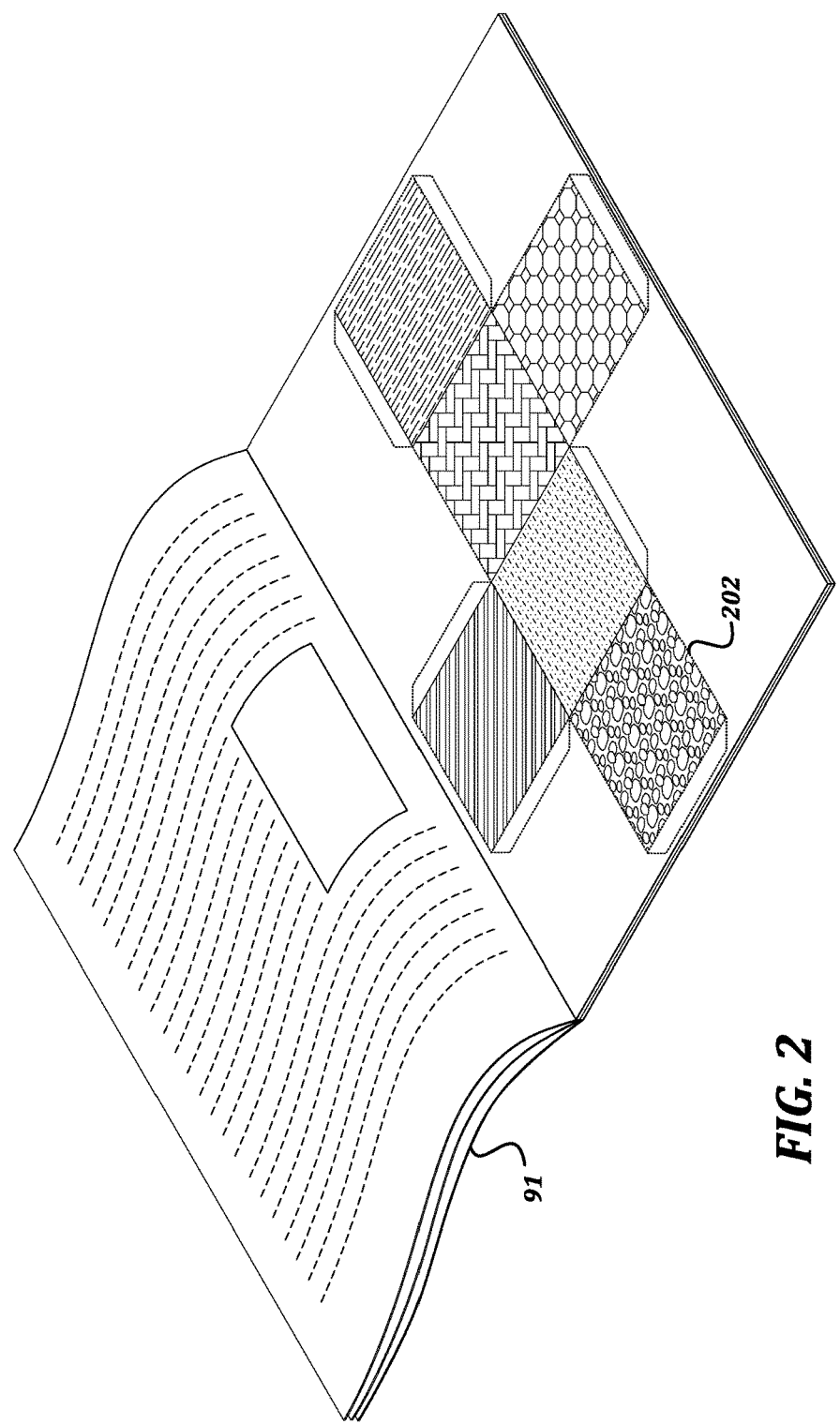
FIG. 2 is an illustration of an example embodiment of a three-dimensional folding pattern as distributed in a magazine, according to various aspects of the present disclosure.

FIG. 2 is an illustration of an example embodiment of a three-dimensional folding pattern as distributed in a magazine, according to various aspects of the present disclosure. As illustrated, the three-dimensional folding pattern 202 is included in the magazine 91 as a tip-in insert or a bind-in insert, but in some embodiments, other methods of associating the three-dimensional folding pattern 202 with the magazine 91 may be used.

Figure 3:
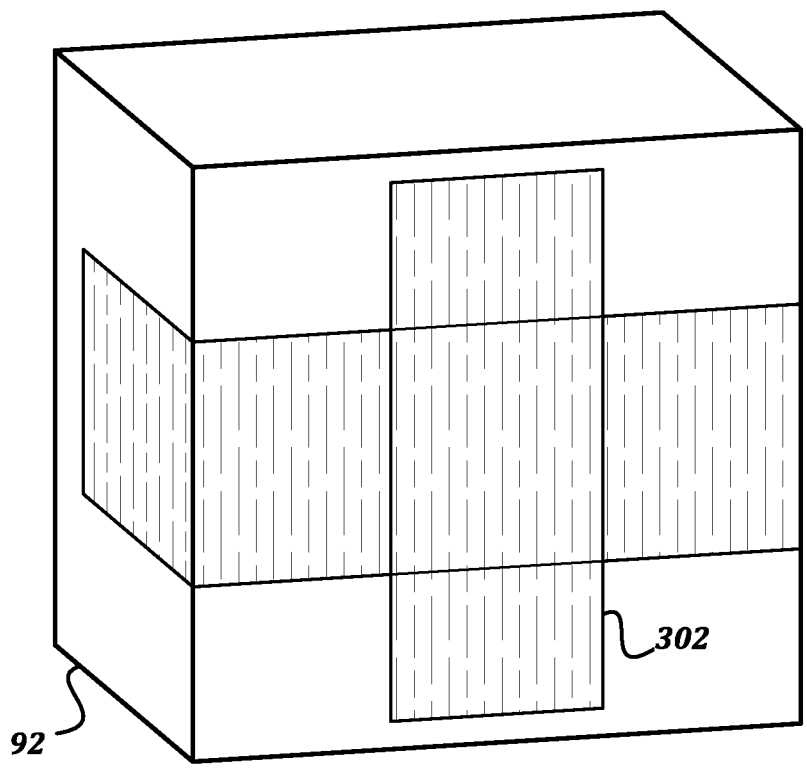
FIG. 3 is an illustration of another example embodiment of a three-dimensional folding pattern as distributed with a product package, according to various aspects of the present disclosure.

FIG. 3 is an illustration of another example embodiment of a three-dimensional folding pattern as distributed with a product package, according to various aspects of the present disclosure. Though illustrated in less detail, the three-dimensional folding pattern 302 is similar to the three-dimensional folding patterns 202, 100 illustrated and described above. Instead of being associated with a magazine 91 as a distribution medium, the three-dimensional folding pattern 302 is associated with a product package 92. In some embodiments, the three-dimensional folding pattern 302 may be removably attached to the product package 92 using removable attachment means such as a temporary adhesive or shrink-wrap. In some embodiments, the three-dimensional folding pattern 302 may be part of a paper layer that is folded around the product package 92. In some embodiments, the three-dimensional folding pattern 302 may be incorporated into the product package 92, and may be removable from the rest of the product package 92 via perforations or other means.

Figure 4:
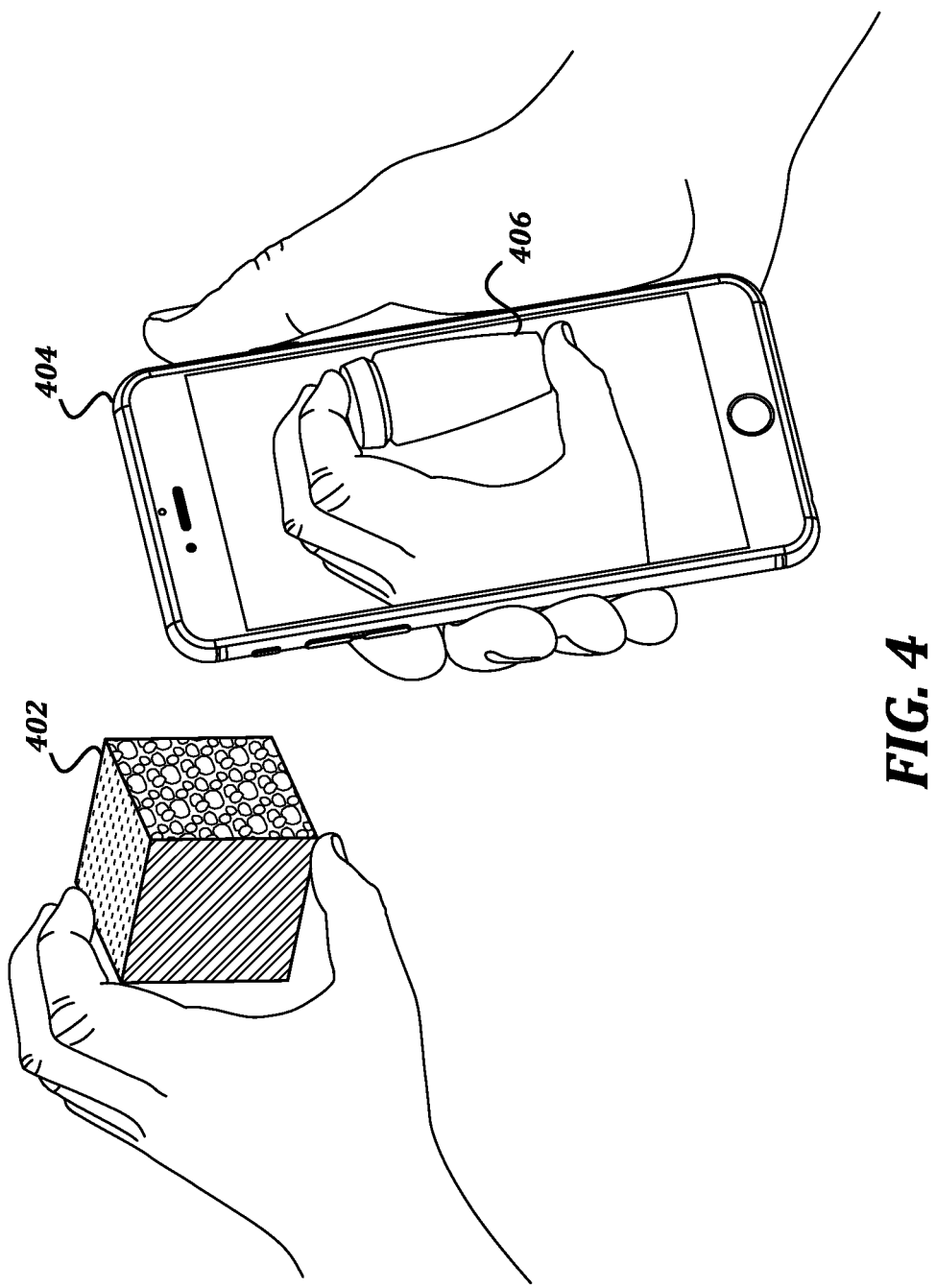
FIG. 4 is an illustration of the use of an example embodiment of a three-dimensional target object according to various aspects of the present disclosure.

FIG. 4 is an illustration of the use of an example embodiment of a three-dimensional target object according to various aspects of the present disclosure. Once the three-dimensional folding pattern is removed from the distribution medium and folded to create the three-dimensional target object 402, the user points a camera of an augmented reality device 404 at the three-dimensional target object 402. The augmented reality device 404 then presents an augmented reality view of the field of view of the camera, which includes a virtual object 406 in the place of the three-dimensional target object 402. As the three-dimensional target object 402 is moved within the field of view of the camera, the virtual object 406 is moved accordingly, thus giving the user the illusion in the augmented reality view that they are holding the virtual object 406.

Figure 5A:
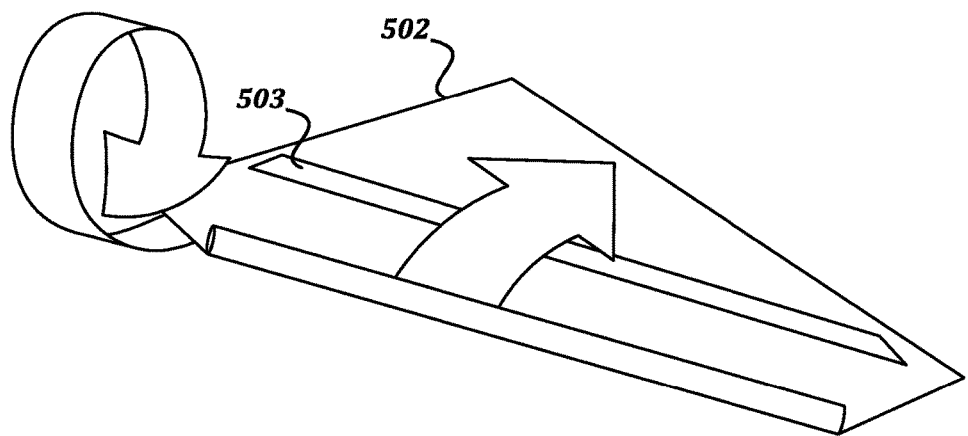
FIGS. 5A and 5B are illustrations of another example embodiment of a three-dimensional folding pattern and the use thereof, according to various aspects of the present disclosure.
Figure 5B:
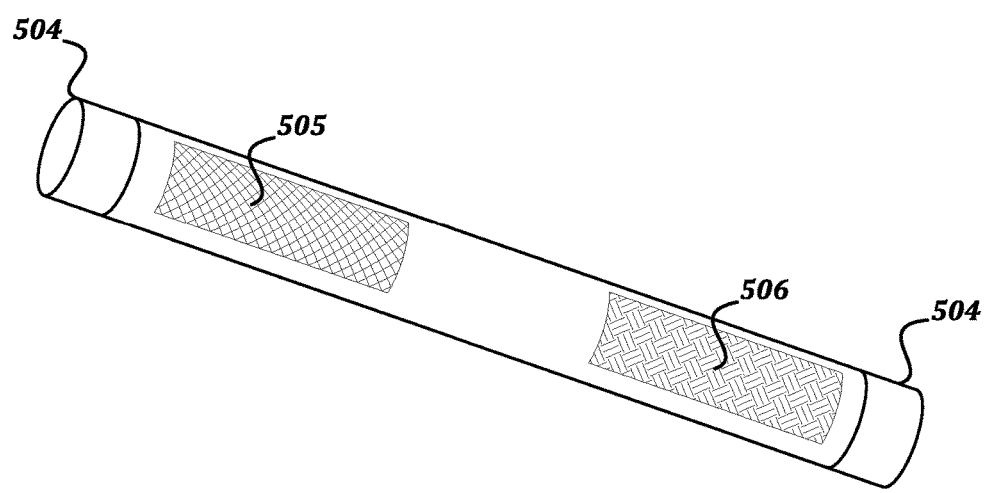

FIGS. 5A and 5B are illustrations of another example embodiment of a three-dimensional folding pattern and the use thereof, according to various aspects of the present disclosure. In FIG. 5A, a different three-dimensional folding pattern 502 is shown. As illustrated, the three-dimensional folding pattern is rolled to create a cylinder, and is secured by joining means 503. FIG. 5B illustrates the three-dimensional target object (in the shape of a wand) formed by the three-dimensional folding pattern 502. The three-dimensional target object includes a tip pattern 504 that repeats on either end of the three-dimensional target object, as well as a first pattern 505 and a second pattern 506. The tip pattern 504 allows the augmented reality device to detect the ends of the wand, while the first pattern 505 and the second pattern 506 allow the augmented reality device to detect the orientation of the wand.

Figure 6:
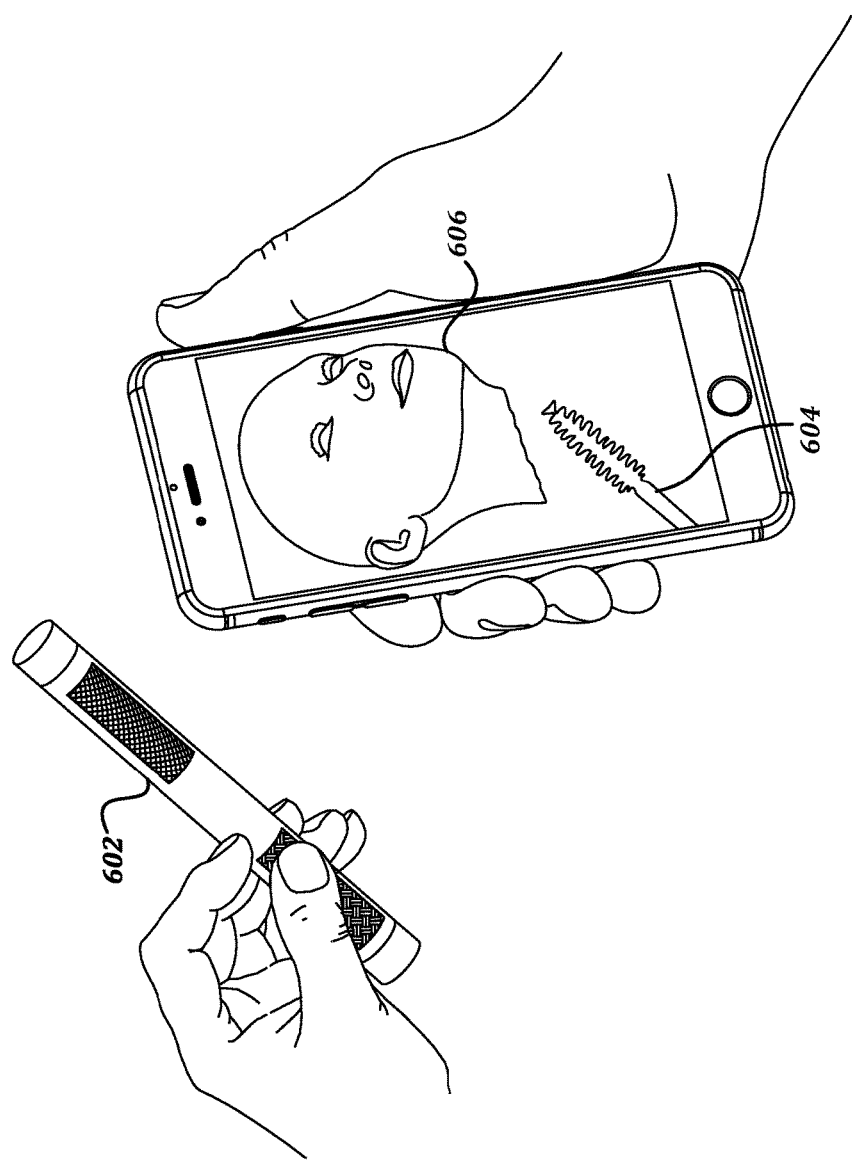
FIG. 6 is an illustration of the use of an example embodiment of a three-dimensional target object according to various aspects of the present disclosure.

FIG. 6 is an illustration of the use of an example embodiment of a three-dimensional target object according to various aspects of the present disclosure. The three-dimensional target object 602 is similar to the wand illustrated in FIG. 5B. As with FIG. 4, the augmented reality display device detects the three-dimensional target object 602, and creates a virtual object 604 anchored to the three-dimensional target object 602 in the augmented reality view. Also shown is an additional virtual object 606 presented in the augmented reality view. The additional virtual object 606 may or may not be anchored to any three-dimensional target object. The user can manipulate the three-dimensional target object 602 such that the virtual object 604 interacts with the additional virtual object 606, and may cause changes to the additional virtual object 606. One example may be the use of a virtual wand 604 to apply mascara to a virtual avatar 606 in order to give an immersive experience to the user.

Figure 7:
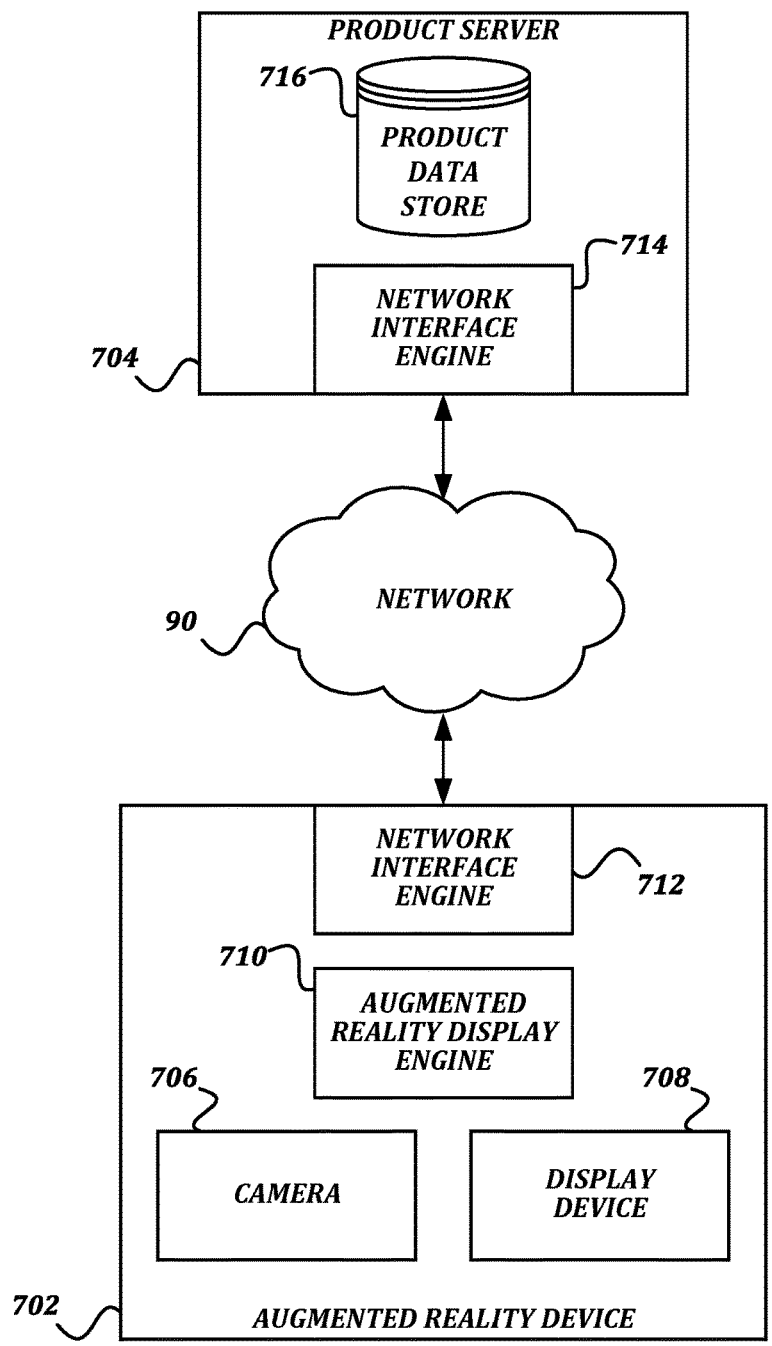
FIG. 7 is a block diagram that illustrates a system for providing an augmented reality experience according to various aspects of the present disclosure.

FIG. 7 is a block diagram that illustrates a system for providing an augmented reality experience according to various aspects of the present disclosure. As illustrated, the system includes an augmented reality device 702 and a product server 704. In some embodiments, the augmented reality device 702 is a smartphone. However, in other embodiments, the augmented reality device 702 could be a tablet computing device, a laptop computing device, a head-mounted computing device, or any other type of computing device having a processor, a memory, and the illustrated components. In some embodiments, the product server 704 may be a server computing device in a data center, one or more computing devices configured to provide the functionality of the product server 704 as a cloud service, or any other suitable type of information distribution technology.

As illustrated, the augmented reality device 702 includes a camera 706 and a display device 708. The camera 706 is typically arranged on a back of the augmented reality device 702, and is configured to generate still image data and/or video data representing the area at which the camera 706 is pointed. The display device 708 is typically arranged on a front of the augmented reality device 702, and is configured to present the still image data and/or video data generated by the camera 706, as well as other content generated by other components of the augmented reality device 702, including but not limited to virtual objects and user interface elements. When the camera 706 and the display device 708 are disposed on opposite sides of the augmented reality device 702, a user can point the camera 706 at a scene and view the captured information on the display device 708 at the same time. In some embodiments where the augmented reality device 702 is not a smartphone, other arrangements of the camera 706 and the display device 708 may be used, as long as the display device 708 can contemporaneously present a scene captured by the camera 706 to a user. In some embodiments (including embodiments wherein stereoscopic presentation is supported), the augmented reality device 702 may include more than one camera 706 and/or more than one display device 708.

As illustrated, the augmented reality device 702 also includes an augmented reality display engine 710, and a network interface engine 712. In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, Swift, Objective-C, and/or the like. An engine may be compiled into executable programs or written in interpreted programming languages. Engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computing devices, thus creating a special purpose computing device configured to provide the engine.

In some embodiments, the augmented reality display engine 710 is configured to analyze data provided by the camera 706, and to generate augmented reality presentations based thereon for display by the display device 708. In some embodiments, the augmented reality display engine 710 is configured to detect the presence of a three-dimensional target object within the field of view of the camera 706, to identify a virtual object associated with the three-dimensional target object, and to present the virtual object along with data generated by the camera 706 in the augmented reality presentation. Further details of the actions performed by the augmented reality display engine 710 are described below.

As illustrated, the product server 704 includes a product data store 716 and a network interface engine 714. As understood by one of ordinary skill in the art, a "data store" as described herein may be any suitable device configured to store data for access by a computing device. One example of a data store is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, the computing device providing the data store may be accessible locally instead of over a network, or may be provided as a cloud-based service. A data store may also include data stored in an organized manner on a computer-readable storage medium, as described further below. One example of such a data store is a file system or database management system that stores data in files (or records) on a computer readable medium such as flash memory, random access memory (RAM), hard disk drives, and/or the like. One of ordinary skill in the art will recognize that separate data stores described herein may be combined into a single data store, and/or a single data store described herein may be separated into multiple data stores, without departing from the scope of the present disclosure.

In some embodiments, the product data store 716 is configured to store information usable to present virtual objects associated with three-dimensional target objects. For example, for a given virtual object, the product data store 716 may store information including but not limited to a unique identifier of the virtual object, data for detecting a three-dimensional target object that is associated with the virtual object, and a three-dimensional model of the virtual object. The data for detecting a three-dimensional target object may include data for identifying one or more patterns applied to the three-dimensional target object. This data may include one or more of the patterns themselves, and/or may include one or more machine learning models that can be used to detect the patterns based on data generated by the camera 706. The data for detecting the three-dimensional target object may also include data for identifying an orientation and position of the three-dimensional target object with respect to the augmented reality device 702. In some embodiments, the product data store 716 may store additional information associated with the virtual objects, including but not limited to product names, links to sources of additional information regarding the products, and links to sources from which the products may be obtained. Further description of the use of the information stored in the product data store 716 is provided below.

As illustrated, the augmented reality device 702 and the product server 704 communicate via a network 90. In some embodiments, the network 90 includes a wireless data connection. This wireless data connection may include a broadband cellular network connection (including but not limited to a 3G connection, a 4G connection, an LTE connection, or a WiMAX connection), a wireless local area network connection (including but not limited to a WiFi connection), a short-range wireless connection (including but not limited to a Bluetooth connection), or any other type of wireless data connection. The network 90 may also include one or more wired connections such as Ethernet, and may also include portions of the Internet. The network interface engine 712 of the augmented reality device 702 and the network interface engine 714 of the product server 704 are complementary, and are configured to enable the exchange of information between the product server 704 and the augmented reality device 702 via the network 90. In some embodiments, the network interface engines 712, 714 include physical layer components for communicating over the network, higher-layer software components for handling communication protocols, logic for providing synchronous and asynchronous query mechanisms, and/or other communication logic. Because the use of network interface engines 712, 714 to communicate via a network 90 in general is well-known technology, the implementation of such is within the ability of one of ordinary skill in the art, and is therefore not described in further detail herein for the sake of brevity.

In the example embodiment illustrated in FIG. 7, the product server 704 and the augmented reality device 702 are separate devices. In some other embodiments, the augmented reality device 702 may be self-contained. That is, in such embodiments, the illustrated as being stored in the product data store 716 and accessed via the network 90 may instead be stored by the augmented reality device 702, in which case communication via the network 90 is not needed to provide the functionality described below.

Figure 8:
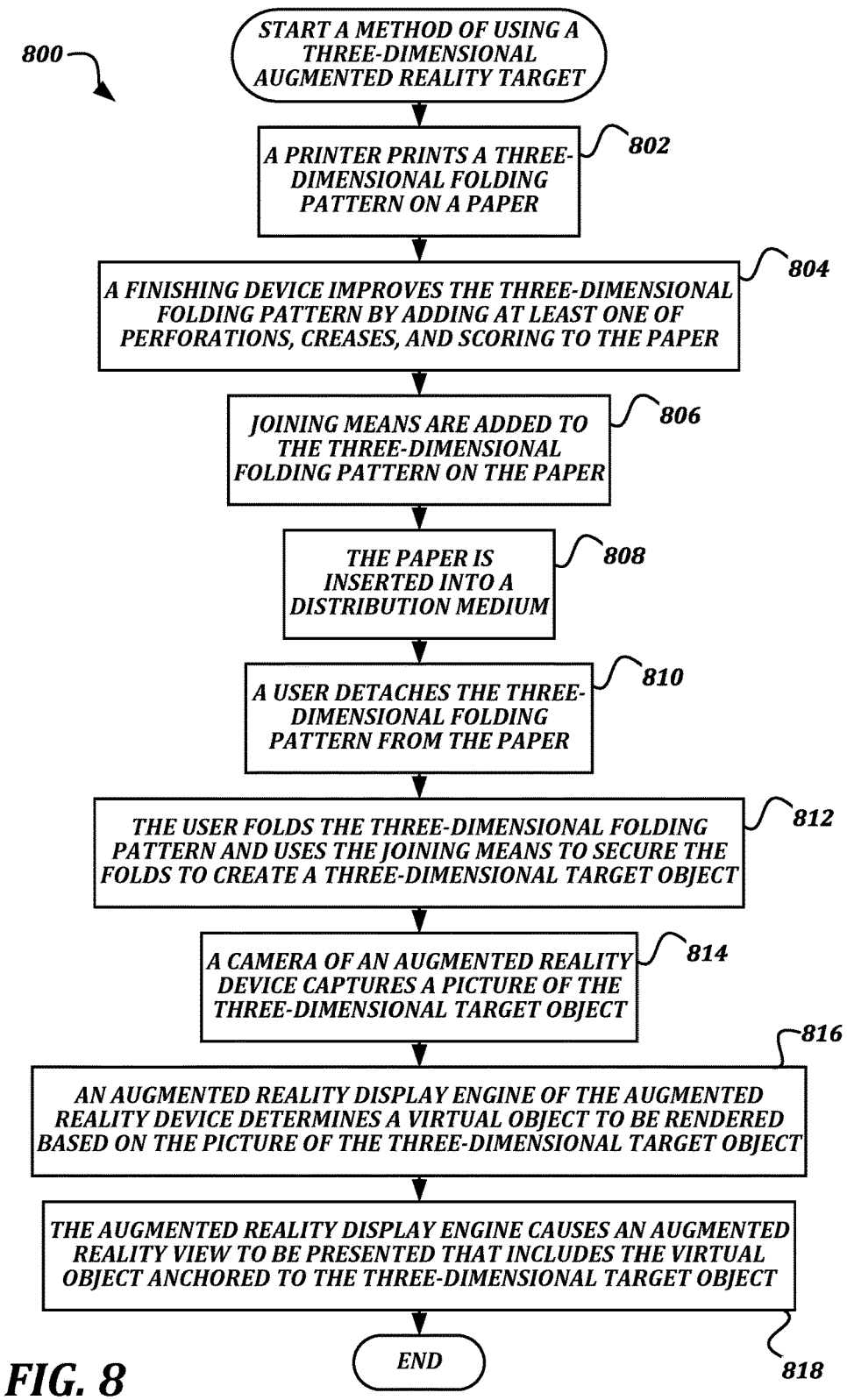
FIG. 8 is a flowchart that illustrates an example embodiment of a method of using a three-dimensional augmented reality target according to various aspects of the present disclosure.

FIG. 8 is a flowchart that illustrates an example embodiment of a method of using a three-dimensional augmented reality target according to various aspects of the present disclosure. From a start block, the method 800 proceeds to block 802, where a printer prints a three-dimensional folding pattern on a paper. Any type of printer may be used, as may any type of paper. In some embodiments, a thick paper such as cardstock or other heavy weight paper may be used in order to provide a level of structural stability to the target object. Some examples of appropriate three-dimensional folding patterns were described above. In some embodiments, the printer may also print additional information on the paper, including but not limited to text copy and images. In some embodiments, the paper may be of a weight and construction to be usable as packaging material for a product.

At block 804, a finishing device improves the three-dimensional folding pattern by adding at least one of perforations, creases, and scoring to the paper. The finishing device may be capable of performing only a subset of these actions (with the other actions to be performed by another finishing device), or the finishing device may perform all of these actions. For example, in some embodiments, a perforating machine may add perforations to the paper, and then a separate creasing machine may add creases to the paper. As another example, in some embodiments, a combined machine may add perforations and creases to the paper. The perforations may make it easier for a user to separate the three-dimensional folding pattern from the paper. The creases and/or scoring may make it easier for the user to fold the three-dimensional folding pattern where intended.

Next, at block 806, joining means are added to the three-dimensional folding pattern on the paper. In some embodiments, removable joining means may be used, including but not limited to magnets and corresponding ferromagnetic materials, adhesive such as a low-tack pressure sensitive adhesive, and tabs and slots formed by additional perforations or cuts in the paper. In some embodiments, more permanent joining means may be used, including but not limited to peel-off adhesive strips or wet-to-seal adhesives.

At block 808, the paper is inserted into a distribution medium. In some embodiments, the distribution medium may be a magazine or other printed publication, and the paper may be inserted as a tip-in insert, a blow-in insert, a bind-in insert, a magna-strip insert, or an outsert. In some embodiments, the distribution medium may be incorporated into, may be attached to, or may constitute a packaging material for a product.

Next, at block 810, a user detaches the three-dimensional folding pattern from the paper. In some embodiments, this may be done by tearing the three-dimensional folding pattern from the paper at perforations around the perimeter of the pattern. In some embodiments, this may include detaching the three-dimensional folding pattern from a removable adhesive holding it in place. In some embodiments, this may include using cutting means such as scissors to cut out the three-dimensional folding pattern.

At block 812, the user folds the three-dimensional folding pattern and uses the joining means to secure the folds to create a three-dimensional target object. In some embodiments, the user may use lines of the printed pattern itself, as well as scoring or creasing present in the three-dimensional folding pattern, to aid in forming the folds to make the three-dimensional target object in the proper shape. If a pressure-sensitive adhesive is used for the joining means, the user may apply pressure to the portion of the three-dimensional folding pattern that includes the adhesive in order to secure an associated fold. If magnets are used for the joining means, the user may simply bring the magnet close enough to the corresponding ferromagnetic material for the two to become attached to each other. If tabs and slots are used for the joining means, the user may insert the tabs into their respective slots. If a peel-off or wet-to-seal adhesive is used as the joining means, the user may take the appropriate actions in order to activate the adhesive and then fold the three-dimensional folding pattern into place.

At this point in the method 818, the three-dimensional target object has been created. Then, at block 814, a camera 706 of an augmented reality device 702 captures a picture of the three-dimensional target object. The picture may be a video or a still picture, and may include a background and other surroundings of the three-dimensional target object. Next, at block 816, an augmented reality display engine 710 of the augmented reality device 702 determines a virtual object to be rendered based on the picture of the three-dimensional target object. In some embodiments, the augmented reality display engine 710 may use computer vision techniques to detect one or more distinctive patterns present on the three-dimensional target object, and may derive identification codes from those patterns. Those identification codes may then be used to query the product data store 716 for the associated virtual object. In some embodiments, different faces of the three-dimensional target object may have different patterns, thus allowing the augmented reality display engine 710 to also determine an orientation of the three-dimensional target object. In some embodiments, the augmented reality display engine 710 may determine the virtual object to be rendered in another way, including but not limited to receiving an indication of an identifying code, virtual object name, or product name via a user interface, or reading an RFID tag coupled to the three-dimensional target object.

The method 800 then proceeds to block 818, where the augmented reality display engine 710 causes an augmented reality view to be presented that includes the virtual object anchored to the three-dimensional target object. As described above, the augmented reality view includes the background and other objects surrounding the three-dimensional target object in the field of view of the camera 706, as well as a virtual object rendered to obscure the three-dimensional target object. The augmented reality display engine 710 uses the camera 706 to track motion of the three-dimensional target object in relation to the augmented reality device 702, and moves the virtual object accordingly in order to provide the illusion that manipulating the three-dimensional target object causes manipulation of the virtual object. In some embodiments, the augmented reality view may also include additional virtual objects, including virtual objects that are not anchored to the three-dimensional target object. Manipulating the three-dimensional target object may allow interaction with the other virtual objects.

The method 800 then proceeds to an end block and terminates.

While illustrative embodiments have been illustrated and described, it will be appreciated that various changes can be made therein without departing from the spirit and scope of the invention.

The invention claimed is:
1. An augmented reality system, comprising:
a flat paper product configured to be folded to form a three-dimensional target shape;
a server computing device comprising a product data store; and
an augmented reality device comprising:
a camera; and
a display device;
wherein the augmented reality device is configured to:
capture an image of the three-dimensional target shape using the camera;
transmit a query to the server computing device for information defining a virtual object associated with the three-dimensional target shape; and
cause the virtual object to be presented by the display device;
wherein causing the virtual object to be presented by the display device includes:
anchoring the virtual object to a detected position of the three-dimensional target shape; and
moving the virtual object to coincide with detected movements of the three-dimensional target shape; and
wherein the augmented reality device is further configured to:
cause presentation of a second virtual object by the display device, wherein the second virtual object is not anchored to a detected position of the three-dimensional target shape, and wherein the second virtual object represents a person; and
in response to detecting a virtual interaction between the virtual object and the second virtual object, change an appearance of the second virtual object by adding a cosmetic product to the second virtual object.

2. The system of claim 1, wherein transmitting the query to the server computing device includes determining an identification design on the three-dimensional target shape.

3. The system of claim 1, wherein the flat paper product includes:
a pattern indicating folds to be applied to the flat paper product to form the flat paper product into the three-dimensional target shape; and
means for attaching a first portion of the pattern to a second portion of the pattern to secure the three-dimensional target shape.

4. The system of claim 1, further comprising a medium within which the flat paper product is inserted.

5. A computer-implemented method, comprising:
capturing, by an augmented reality device, an image of a three-dimensional target shape using a camera of the augmented reality device, wherein the three-dimensional target shape is formed by a flat paper product configured to be folded to make the three-dimensional target shape;
transmitting, by the augmented reality device, a query to a server computing device for information defining a virtual object associated with the three-dimensional target shape;
causing, by the augmented reality device, the virtual object to be presented by a display device of the augmented reality device, wherein causing the virtual object to be presented by the display device includes:
anchoring the virtual object to a detected position of the three-dimensional target shape; and
moving the virtual object to coincide with detected movements of the three-dimensional target shape;
causing, by the augmented reality device, presentation of a second virtual object by the display device, wherein the second virtual object is not anchored to a detected position of the three-dimensional target shape, and wherein the second virtual object represents a person; and
in response to detecting a virtual interaction between the virtual object and the second virtual object, changing an appearance of the second virtual object by adding a cosmetic product to the second virtual object.

6. The method of claim 5, wherein transmitting the query to the server computing device includes determining an identification design on the three-dimensional target shape.

7. A non-transitory computer-readable medium having computer-executable instructions stored thereon that, in response to execution by one or more processors of an augmented reality device, cause the augmented reality device to perform actions comprising:
capturing, by the augmented reality device, an image of a three-dimensional target shape using a camera of the augmented reality device, wherein the three-dimensional target shape is formed by a flat paper product configured to be folded to make the three-dimensional target shape;
transmitting, by the augmented reality device, a query to a server computing device for information defining a virtual object associated with the three-dimensional target shape;
causing, by the augmented reality device, the virtual object to be presented by a display device of the augmented reality device, wherein causing the virtual object to be presented by the display device includes:
anchoring the virtual object to a detected position of the three-dimensional target shape; and
moving the virtual object to coincide with detected movements of the three-dimensional target shape;
causing, by the augmented reality device, presentation of a second virtual object by the display device, wherein the second virtual object is not anchored to a detected position of the three-dimensional target shape, and wherein the second virtual object represents a person; and
in response to detecting a virtual interaction between the virtual object and the second virtual object, changing an appearance of the second virtual object by adding a cosmetic product to the second virtual object.

8. The computer-readable medium of claim 7, wherein transmitting the query to the server computing device includes determining an identification design on the three-dimensional target shape.

* * * * *